US010963343B1

United States Patent
Khadiwala et al.

(10) Patent No.: US 10,963,343 B1
(45) Date of Patent: *Mar. 30, 2021

(54) FACILITATION OF TEMPORARY STORAGE OF A SLICE IN A STORAGE UNIT (SU)

(71) Applicant: Pure Storage, Inc., Mountain View, CA (US)

(72) Inventors: Ravi V. Khadiwala, Bartlett, IL (US); Yogesh R. Vedpathak, Chicago, IL (US); Jason K. Resch, Chicago, IL (US); Asimuddin Kazi, Naperville, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,430

(22) Filed: Dec. 23, 2019

Related U.S. Application Data

(63) Continuation of application No. 15/837,455, filed on Dec. 11, 2017, now Pat. No. 10,521,298, which is a
(Continued)

(51) Int. Cl.
*G06F 11/10* (2006.01)
*G06F 11/00* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |
| (Continued) |

OTHER PUBLICATIONS

Shamir; How to Share a Secret; Communications of the ACM; vol. 22, No. 11; Nov. 1979; pp. 612-613.
(Continued)

*Primary Examiner* — Justin R Knapp
(74) *Attorney, Agent, or Firm* — Garlick & Markison; Shayne X. Short (57) ABSTRACT

A computing device includes an interface configured to interface and communicate with a dispersed storage network (DSN), a memory that stores operational instructions, and processing circuitry. The computing device issues a set of write requests to a first storage unit (SU) set based on a set of encoded data slices (EDSs) associated with a data object to be stored therein. When a write threshold number and fewer than all of the set of EDSs have been successfully stored, the computing device determines to store temporarily within a second SU set remaining EDS(s) that has not been successfully stored within the first SUs set and facilitates temporary storage thereof within the second SU set. Upon recovery of the EDS(s) from the temporary storage within the second SU set, the computing device issues additional write request(s) to the first SU set based on the EDS(s).

20 Claims, 7 Drawing Sheets

Related U.S. Application Data continuation-in-part of application No. 15/642,875, filed on Jul. 6, 2017, now Pat. No. 10,120,739, which is a continuation-in-part of application No. 14/869,240, filed on Sep. 29, 2015, now Pat. No. 9,727,275.

(60) Provisional application No. 62/086,542, filed on Dec. 2, 2014.

(51) Int. Cl.
    *G06F 3/06* (2006.01)
    *G06F 3/00* (2006.01)
    *G06F 16/18* (2019.01)

(52) U.S. Cl.
    CPC ........ *G06F 3/0619* (2013.01); *G06F 11/1092* (2013.01); *G06F 16/18* (2019.01); *G06F 2211/1028* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2018/0124176 A1 | 5/2018 | McShane |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

FACILITATION OF TEMPORARY STORAGE
OF A SLICE IN A STORAGE UNIT (SU)

CROSS REFERENCE TO RELATED PATENTS

The present U.S. Utility Patent Application also claims priority pursuant to 35 U.S.C. § 120, as a continuation of U.S. Utility patent application Ser. No. 15/837,455, entitled "TEMPORARILY STORING DROPPED AND REBUILT SLICES IN A DSN MEMORY," filed Dec. 11, 2017, scheduled to issue as U.S. Pat. No. 10,521,298 on Dec. 31, 2019, which is a continuation-in-part (CIP) of U.S. Utility patent application Ser. No. 15/642,875, entitled "PRIORITIZED DATA REBUILDING IN A DISPERSED STORAGE NETWORK," filed Jul. 6, 2017, issued as U.S. Pat. No. 10,120,739 on Nov. 6, 2018, which claims priority pursuant to 35 U.S.C. § 120, as a continuation-in-part (CIP) of U.S. Utility patent application Ser. No. 14/869,240, entitled "COORDINATING STORAGE OF DATA IN DISPERSED STORAGE NETWORKS," filed Sep. 29, 2015, issued as U.S. Pat. No. 9,727,275 on Aug. 8, 2017, which claims priority pursuant to 35 U.S.C. § 119(e) to U.S. Provisional Application No. 62/086,542, entitled "CONSISTENT STORAGE OF DATA IN A DISPERSED STORAGE NETWORK," filed Dec. 2, 2014, all of which are hereby incorporated herein by reference in their entirety and made part of the present U.S. Utility Patent Application for all purposes.

STATEMENT REGARDING FEDERALLY
SPONSORED RESEARCH OR DEVELOPMENT

Not applicable.

INCORPORATION-BY-REFERENCE OF
MATERIAL SUBMITTED ON A COMPACT
DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within prior art data storage systems, sometimes storage processes less than fully unsuccessful. When unsuccessful, the prior art does not provide adequate and acceptable means by which unsuccessful storage attempts and processes may be made successful. There exists room for improvement within prior art data storage systems regarding the manner by which data storage processes may be performed.

DETAILED DESCRIPTION OF THE
INVENTION

Figure 1:
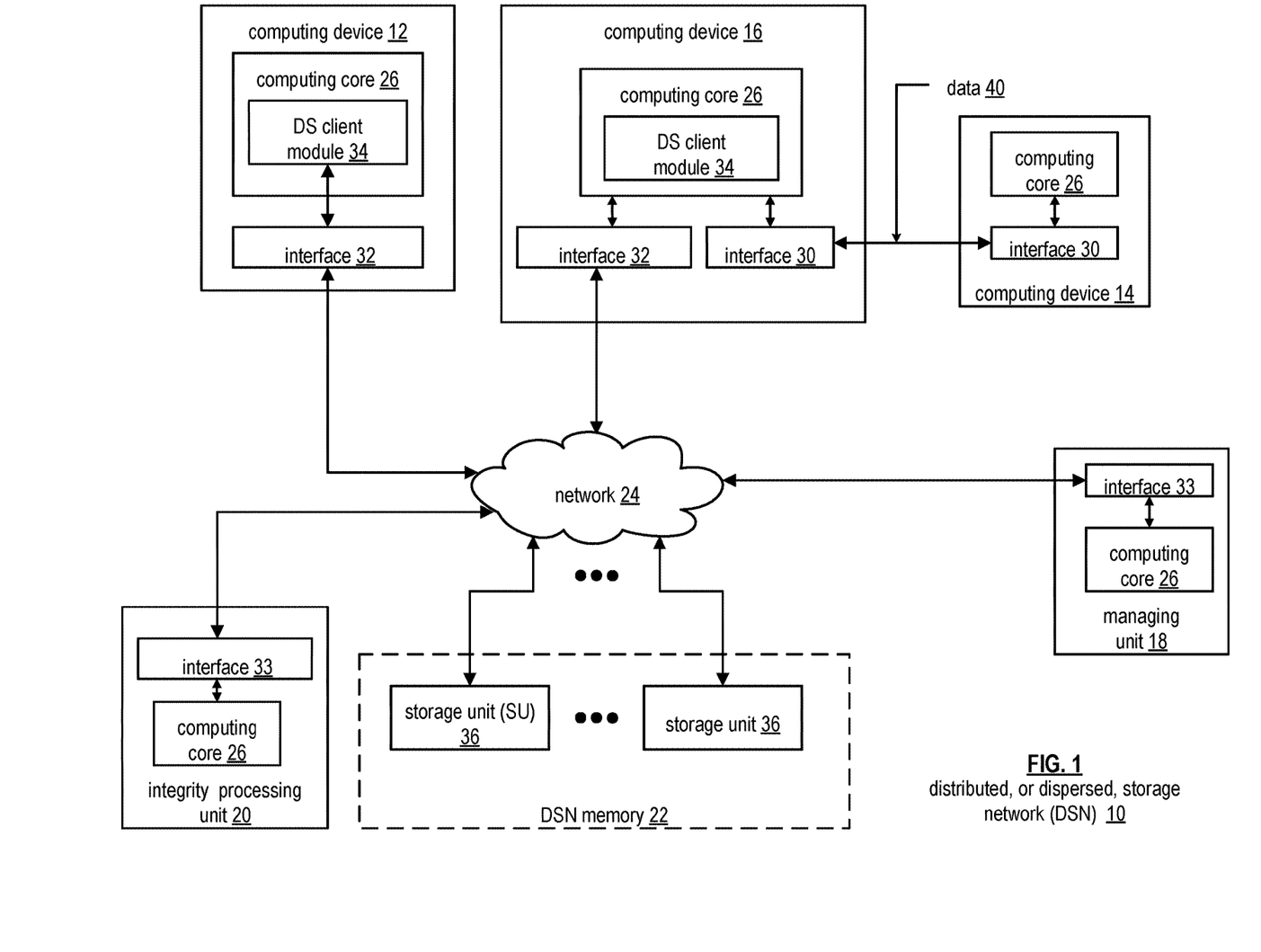
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
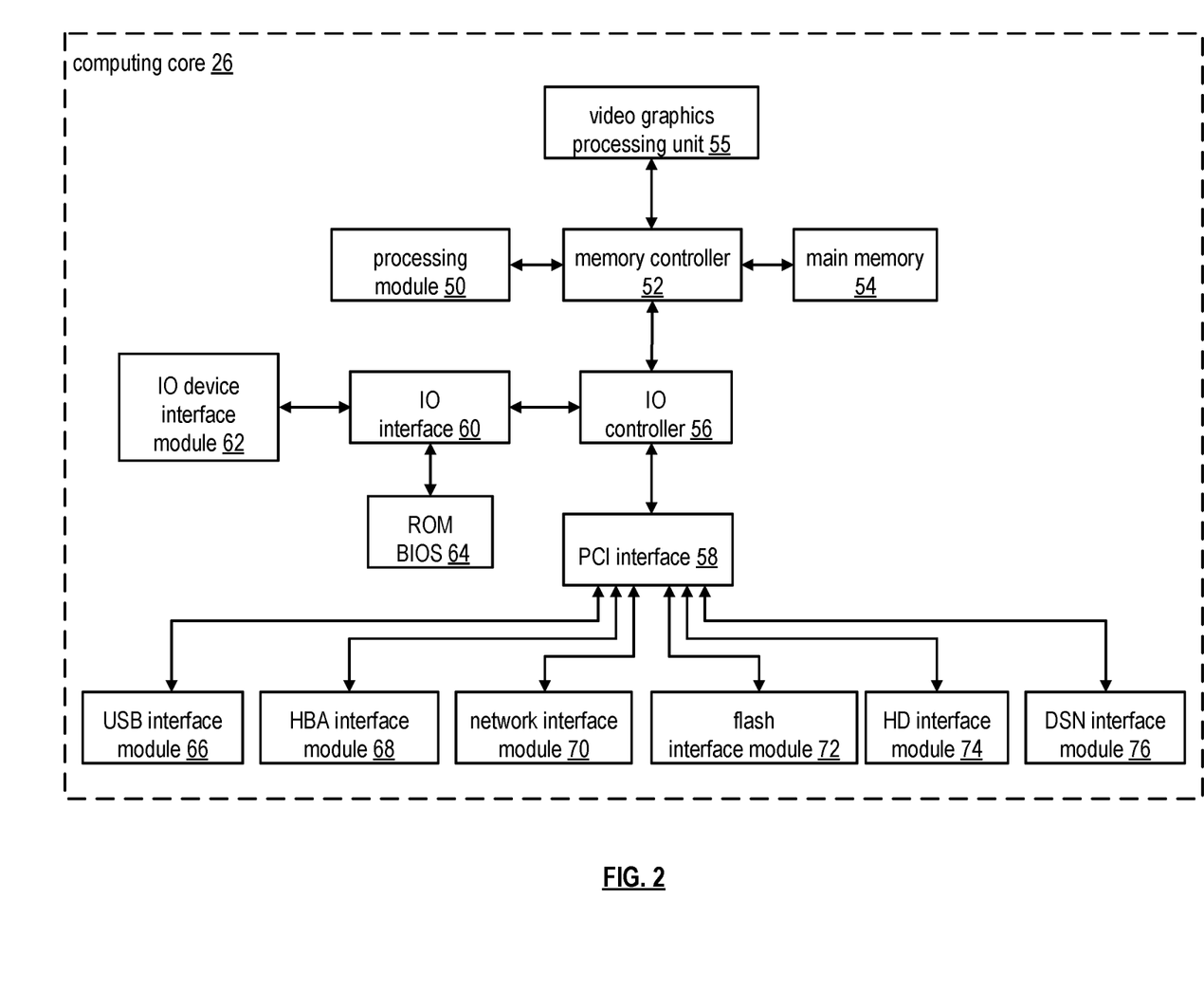
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
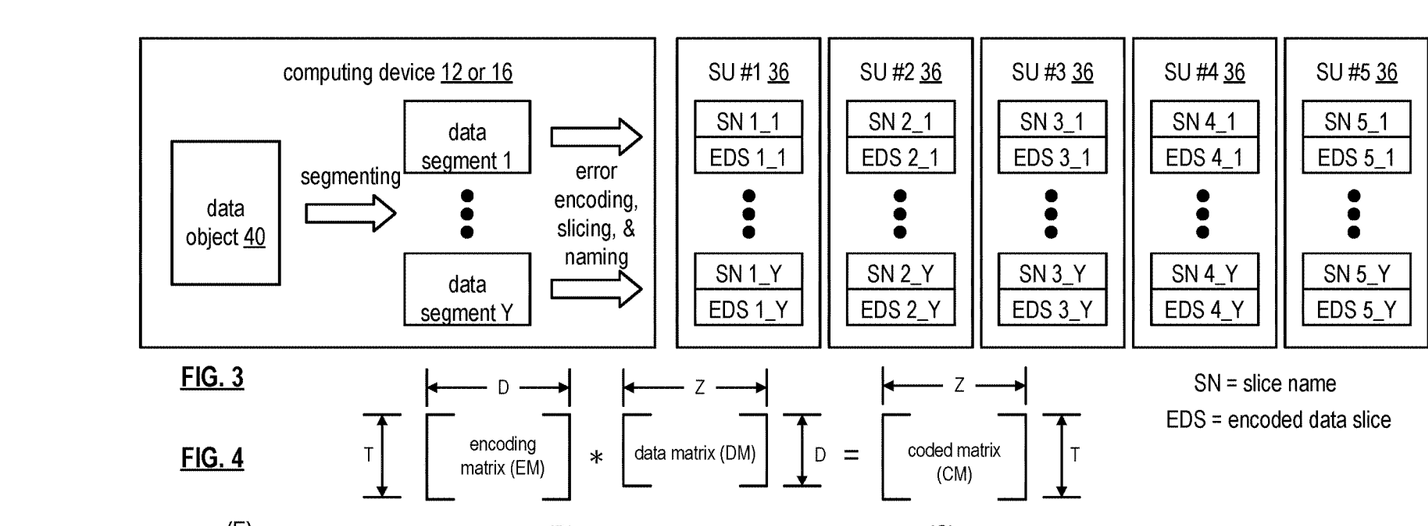
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

Figure 5:
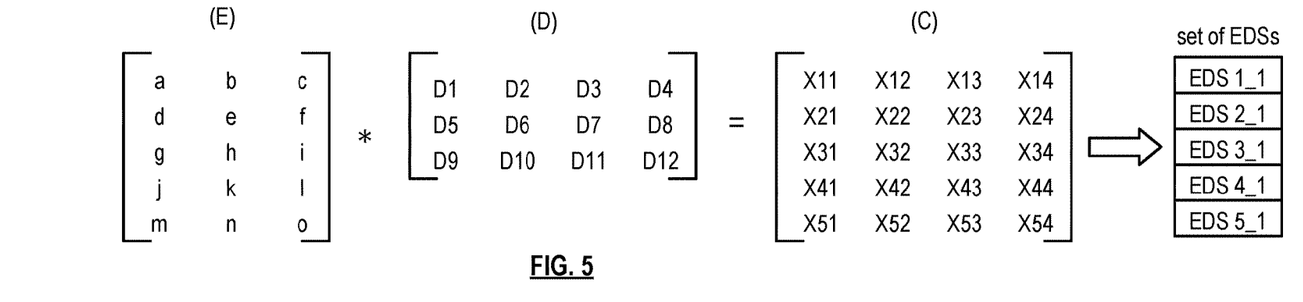
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
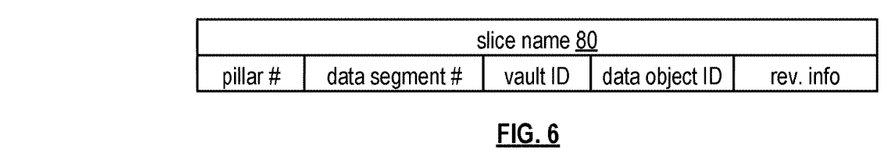
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
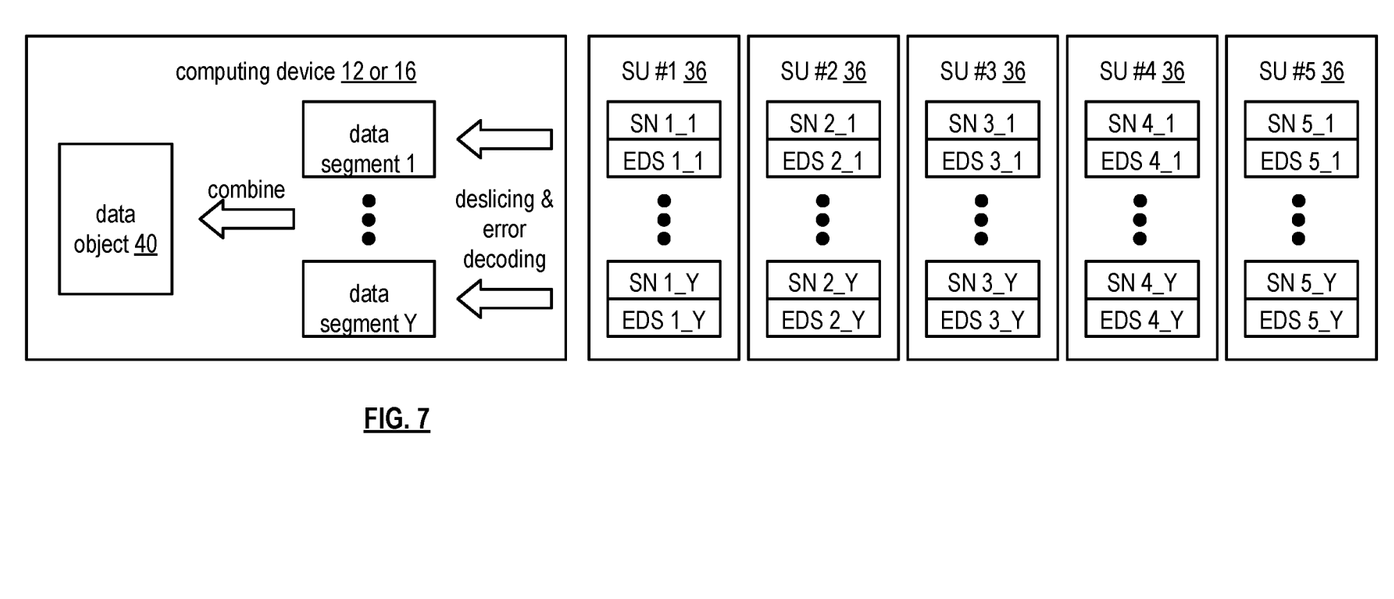
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
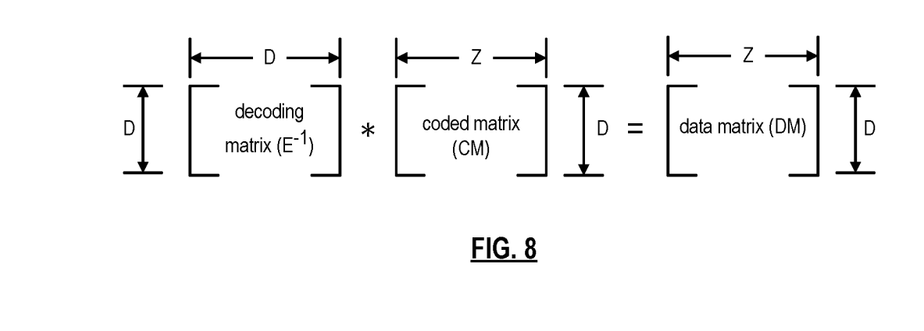
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
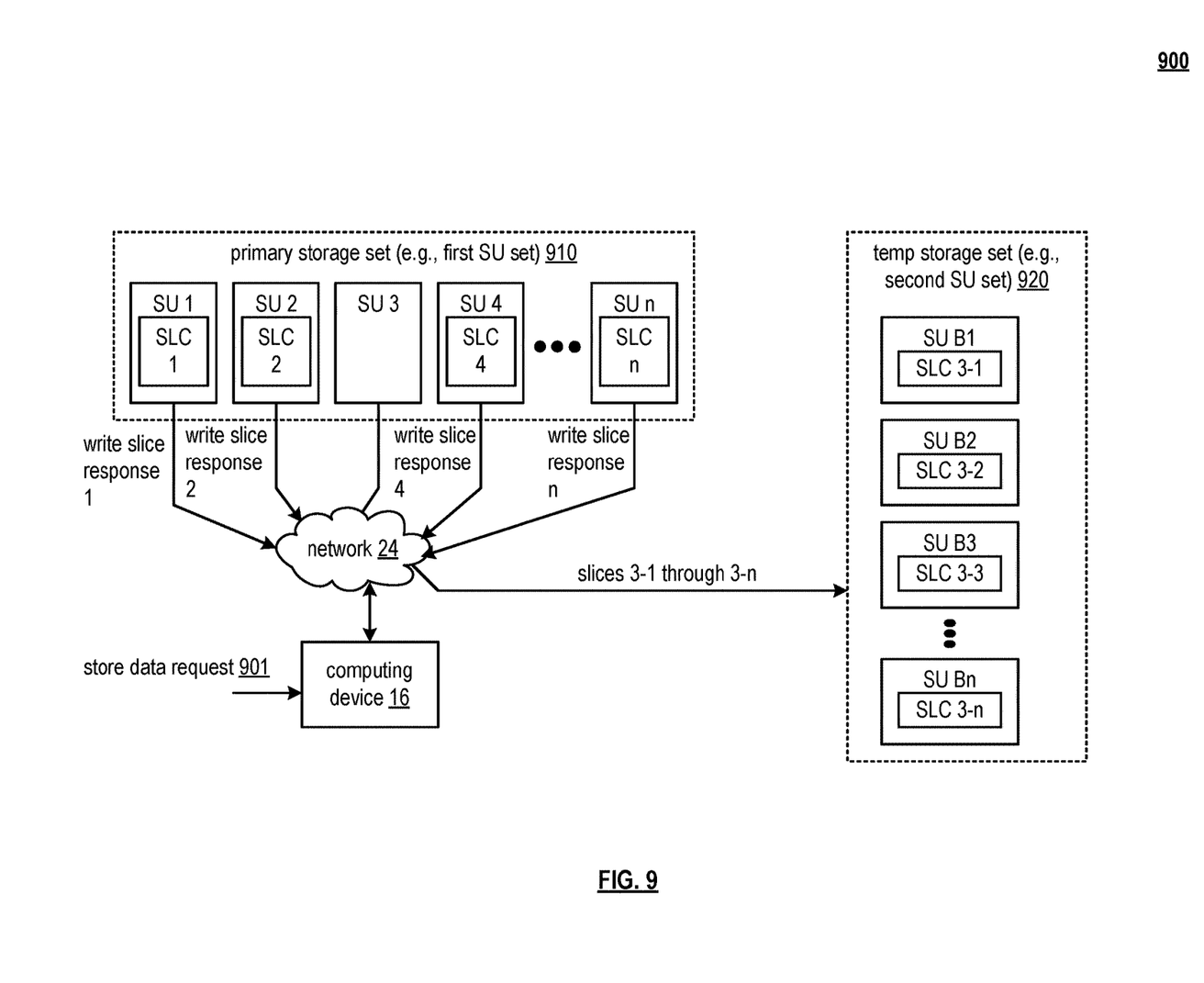
FIG. 9 is a schematic block diagram of another embodiment of a dispersed or distributed storage network (DSN) in accordance with the present invention.

FIG. 9 is a schematic block diagram of another embodiment 900 of a dispersed or distributed storage network (DSN) in accordance with the present invention. This diagram includes a schematic block diagram of another embodiment of a DSN that includes a primary storage set (e.g., a first SU set) 910, a temporary storage set (e.g., a second SU set) 910, the network 24 of FIG. 1, and the computing device 16 of FIG. 1. The primary storage set 910 includes a set of storage units (SUs) 1-n. The temporary storage set 920 includes another set of SUs B1-Bn. A number of SUs of the primary storage set 910 may be different for the same as a number of SUs of the temporary storage set 920. Each SU may be implemented utilizing one or the SUs 36 of the DSN memory 22 of FIG. 1.

The DSN functions to store data in one or more of the primary storage set 910 and the temporary storage set 920. In an example of operation of the storing of the data, the computing device 16 receives a store data request 901, where the store data request 901 includes one or more of the data, a data identifier, and a requesting entity identifier. Having received the store data request 901, the computing device 16 dispersed storage error encodes the data to produce a plurality of sets of encoded data slices. Having produced the encoded data slices, the computing device 16 generates one or more sets of write slice requests, where the one or more sets of write slice requests includes the plurality of sets of encoded data slices.

Having produced the one or more sets of write slice request, the computing device 16 issues, via the network 24, the one or more write slice requests to the SUs of the primary storage set 910. Each SU receiving a write slice request and successfully storing an encoded data slice, issues a write slice response, via the network 24, to the computing device 16 indicating that the encoded data slice has been successfully stored. For example, the SU 1 issues a write slice response 1 to the computing device 16, where the write slice response 1 indicates that an encoded data slice 1 has been successfully stored within the SU 1.

The computing device 16 receives write slice responses from at least some of the SUs of the primary storage set 910. When the computing device 16 receives write slice responses indicating that at least a write threshold number of encoded data slices have been successfully stored, the computing device 16 may detect a failure of storage of an encoded data slice associated with the storage error. The detecting includes at least one of interpreting a received write slice response that indicates that the storage error and determining that a storage timeframe has elapsed since issuing a write slice request without receiving a corresponding write slice response. For example, the computing device 16 indicates that an encoded data slice 3 is an error slice when the computing device 16 determines that the storage timeframe elapsed for storage of an encoded data slice 3 that was sent to the SU 3 for storage, without receiving an indication that the encoded data slice 3 was successfully stored.

Having determined the error slice, the computing device 16 determines whether to temporarily store the encoded data slice. The determining may be based on one or more of expected future availability of the SU 3 associated with the error slice, a predetermination, a priority level, interpreting a request, interpreting a system registry entry, and the requesting entity identifier. For example, the computing device 16 indicates to temporarily store the encoded data slice when the expected future availability of the SU 3 is less than an availability threshold level. As another example, the computing device 16 indicates to temporarily store the encoded data slice when an interpretation of the system registry indicates to temporarily store all detected error slices associated with a virtual storage vault affiliated with the requesting entity identifier.

When temporarily storing encoded data slice, the computing device 16 dispersed storage error encodes the error slice to produce a set of temporary encoded data slices. For example, the computing device 16 dispersed storage error encodes encoded data slice 3 to produce temporary encoded data slices 3-1 through 3-n. Having produced the set of temporary encoded data slices, the computing device 16 facilitates storage of the set of temporary encoded data slices in SUs of the temporary storage set 920. For example, the computing device 16 issues, via the network 24, a set of write temporary slice requests to SUs B1 through Bn, where the set of write temporary slice requests includes the set of temporary encoded data slices 3-1 through 3-n.

Subsequent to storage of the set of temporary encoded data slices, the computing device 16 determines to re-store the error slice in the primary set of SUs. The determining may be based on one or more of detecting that a weight timeframe has expired from a previous attempt, detecting that a SU error condition has subsided, favorable SU availability is detected, receiving a recovery request for the error slice, detecting that available capacity of the temporary storage set 920 is less than a low threshold level, and detecting that an activity indicator indicates a level of activity that is lower than a low threshold level. Alternatively, or in addition to, a SU of the primary storage set 910 determines to re-store the error slice in the primary set of SUs.

Having determined to re-store the error slice in the primary set of SUs, the computing device 16 recovers the encoded data slice from the temporary stored set. For example, the computing device 16 issues, via the network 24, a set of read slice requests to the SUs B1-Bn, receives read slice responses, and dispersed storage error decodes a decode threshold number of received temporary encoded data slices to reproduce encoded data slice 3.

Having reproduced the error slice, the computing device 16 facilitates storage of the reproduced error slice in a primary storage set 910. For example, the computing device 16 issues, via the network 24, a write slice request to SU 3, where the write slice request includes the reproduced encoded data slice 3.

In an example of operation and implementation, a computing device and/or storage unit (SU) includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device and/or SU based on the operational instructions, is configured to perform various operations, functions, etc. in certain examples, the processing module, processor, and/or processing circuitry, when operable within the computing device and/or SU is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, the computing device 16 is configured to issue a set of write requests to a first storage unit (SU) set (e.g., primary storage set 910) based on a set of encoded data slices (EDSs) associated with a data object to be stored therein. Note that the data object is segmented into a plurality of data segments, and a data segment of the plurality of data segments is dispersed error encoded in accordance with dispersed error encoding parameters to produce the set of EDSs. Also, note that a write threshold number of EDSs provides for a successful transfer of the set of EDSs from a first at least one location in the DSN to a second at least one location in the DSN.

The computing device 16 is also configured to determine that the write threshold number of EDSs and fewer than all of the set of EDSs have been successfully stored within the first SUs set based on at least some write responses from at least some storage units (SUs) of the first SU set. The computing device 16 is also configured to determine to store temporarily within a second SU set (e.g., temporary storage se) at least one remaining EDS of the set of EDSs that has not been successfully stored within the first SUs set. The computing device 16 is also configured to facilitate temporary storage of the at least one remaining EDS of the set of EDSs within the second SU set. The computing device 16 is also configured to recover the at least one remaining EDS from the temporary storage within the second SU set. The computing device 16 is also configured to issue at least one additional write request to the first SU set based on the at least one remaining EDS.

In some examples, the computing device 16 is also configured to receive (e.g., from a requesting entity such as another computing device, a SU, etc.) a store data request that includes the data object, a data identifier, and/or a requesting entity identifier. The computing device 16 is also configured to dispersed error encode the data object in accordance with the dispersed error encoding parameters to produce the set of EDSs.

In even other examples, the computing device 16 is also configured detect at least one storage failure associated with the at least one remaining EDS of the set of EDSs based on interpretation of at least one received write response that indicates a storage error and/or determination that a storage timeframe has elapsed since issuing at least one of the set of write requests without receiving a corresponding write response.

Also, in certain examples, the computing device 16 is also configured determine to store temporarily within the second SU set at least one remaining EDS of the set of EDSs that has not been successfully stored within the first SUs set based on expected future availability of at least one SU of the first SU set, a predetermination, a priority level, interpretation of a request, interpretation of a system registry entry, a requesting entity identifier, an expected future availability of the at least one SU of the first SU set being less than an availability threshold level, and/or interpretation of the system registry that indicates to store temporarily at least one detected EDS error that is associated with a virtual storage vault affiliated with the requesting entity identifier.

In some examples, with respect to a data object, the data object is segmented into a plurality of data segments, and a data segment of the plurality of data segments is dispersed error encoded in accordance with dispersed error encoding parameters to produce a set of encoded data slices (EDSs). Such a set of EDSs are or may then be distributedly stored in a plurality of storage units (SUs) within the DSN (e.g., a first SU set, a second SU set, and/or other SUs). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, DS unit, computing device, at least one SU of a plurality of SUs within the DSN (e.g., such as a plurality of SUs that are implemented to store distributedly the set of EDSs, the first SU set, the second SU set, etc.), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

Figure 10:
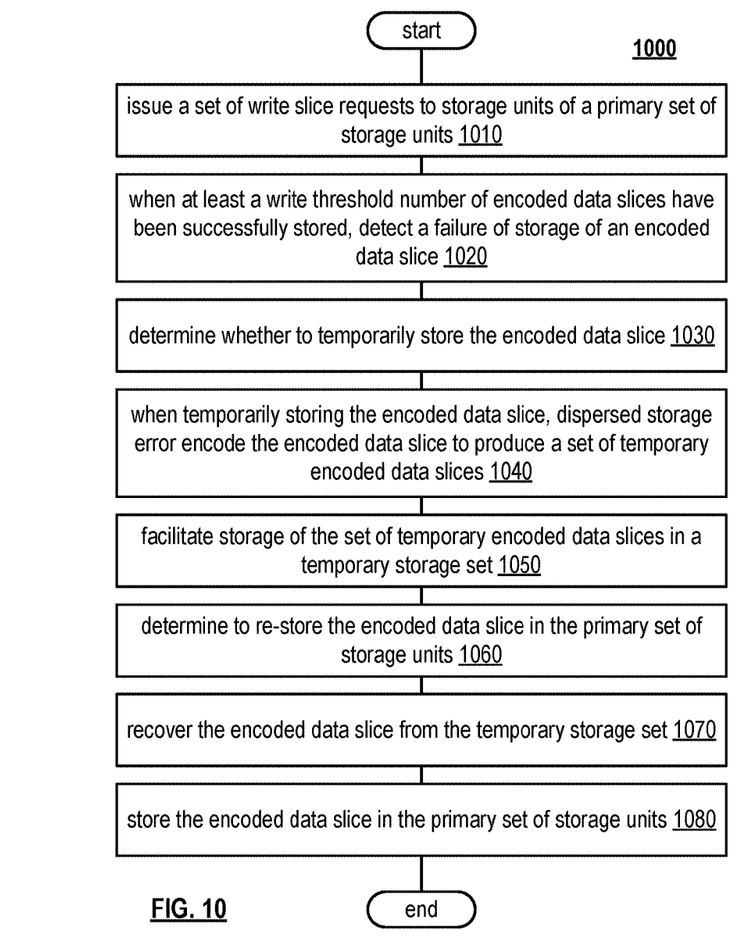
FIG. 10 is a flowchart illustrating an example of storing data in accordance with the present invention.

FIG. 10 is a flowchart illustrating an example 1000 of storing data in accordance with the present invention. This diagram includes a flowchart illustrating an example of storing data. The method 1000 begins at a step 1010 where a processing module (e.g., of a distributed storage (DS) client module of a computing device such as computing device 16 of FIG. 1) issues a set of write slice requests to SUs of a primary set of SUs. For example, the processing module dispersed storage error encodes data to produce a plurality of sets of encoded data slices, generates the set of write slice requests to include one or more sets of encoded data slices of the plurality of sets of encoded data slices, and sends the set of write slice requests to the set of SUs of the primary set of SUs.

When at least a write threshold number of encoded data slices have been successfully stored, the method 1000 continues at the step 1020 where the processing module detects the failure of storage of an encoded data slice. For example, the processing module determines that the write threshold number of encoded data slices have been successfully stored based on interpreting a received write slice responses, and identifies the failure of the storage of the encoded data slice based on the received write slice responses (e.g., a missing response, interpreting a received response that indicates a storage error).

The method 1000 continues at the step 1030 where the processing module determines whether to temporarily store the encoded data slice. The determining may be based on one or more of availability of a SU associated with the detected failure of storage, a predetermination, a priority level, a request, a lookup, and a requesting entity identifier. For example, the processing module indicates to temporarily stored the encoded data slice when determining that availability of the SU associated with encoded data slice is unfavorable (e.g., the SU is not expected to be available for a time frame that is greater than a maximum threshold time level or the SU availability timing is unknown).

When temporarily storing encoded data slice, the method 1000 continues at the step 1040 where the processing module dispersed storage error encodes the encoded data slice to produce a set of temporary encoded data slices. The method 1000 continues at the step 1050 where the processing module facilitates storage of the set of temporary encoded data slices in a temporary storage set. The facilitating includes identifying a storage location of the temporary storage set based on one or more of a predetermination, interpreting a system registry, receiving a request, and identifying the temporary storage set. The facilitating further includes generating a set of write slice requests that includes the set of temporary encoded data slices and sending the set of temporary encoded data slices to the temporary storage set.

The method 1000 continues at the step 1060 where the processing module subsequently determines to re-store the encoded data slice in the primary set of SUs. The determining may include one or more of detecting that an expiration timeframe has expired since a previous storage attempt of encoded data slice, and detecting favorable availability of a SU associated with the encoded data slice and the primary set of SUs.

The method 1000 continues at the step 1070 where the processing module recovers the encoded data slice from the temporary storage set. For example, the processing module issues read slice requests to the temporary storage set, receives read slice responses, and dispersed storage error decodes a decode threshold number of received temporary encoded data slices to reproduce the encoded data slice.

The method 1000 continues at the step 1080 where the processing module stores the encoded data slice in the primary set of SUs. For example, the processing module identifies the SU associated with the encoded data slice, generates a write slice request that includes the reproduced encoded data slice and a slice name associated with the encoded data slice, and sends the write slice request to the identified SU.

Figure 11:
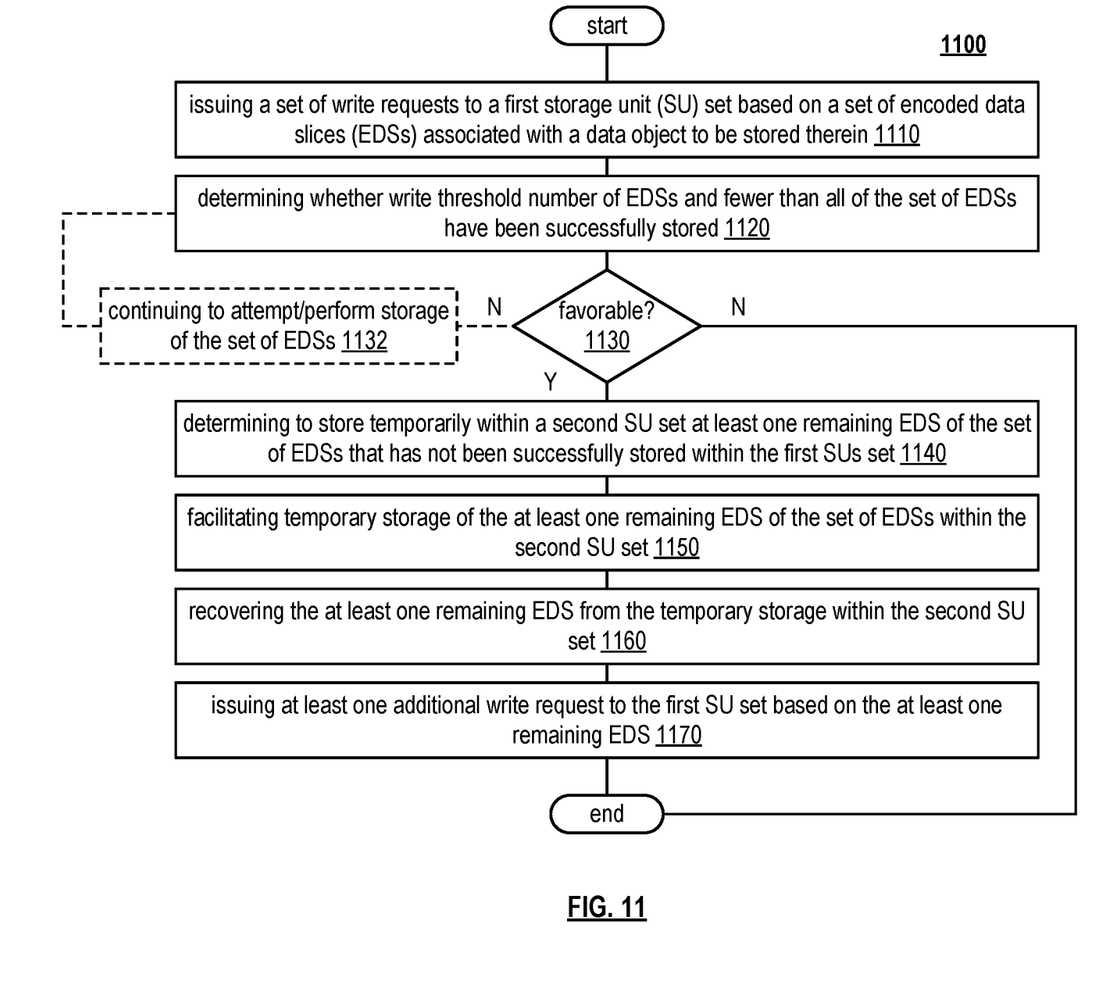
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention. The method 1100 operates in step 1120 by issuing (via an interface of a computing device that is configured to interface and communicate with a dispersed or distributed storage network (DSN)) a set of write requests to a first storage unit (SU) set based on a set of encoded data slices (EDSs) associated with a data object to be stored therein. The data object is segmented into a plurality of data segments, and a data segment of the plurality of data segments is dispersed error encoded in accordance with dispersed error encoding parameters to produce the set of EDSs. Also, a write threshold number of EDSs provides for a successful transfer of the set of EDSs from a first at least one location in the DSN to a second at least one location in the DSN.

The method 1100 then continues in step 1120 by determining that the write threshold number of EDSs and fewer than all of the set of EDSs have been successfully stored within the first SUs set based on at least some write responses from at least some storage units (SUs) of the first SU set. When it is unfavorably determined that the write threshold number of EDSs and fewer than all of the set of EDSs have been successfully stored, the method 1100 ends or alternatively operates in step 1132 by continuing to attempt/perform storage of the set of EDSs and loops back to step 1120.

Alternatively, when it is favorably determined that the write threshold number of EDSs and fewer than all of the set of EDSs have been successfully stored, the method 1100 continues in step 1140 by determining to store temporarily within a second SU set at least one remaining EDS of the set of EDSs that has not been successfully stored within the first SUs set.

The method 1100 then operates in step 1150 by facilitating (e.g., via the interface) temporary storage of the at least one remaining EDS of the set of EDSs within the second SU set. The method 1100 operates in step 1160 by recovering (e.g., via the interface) the at least one remaining EDS from the temporary storage within the second SU set. The method 1100 then operates in step 1170 by issuing (e.g., via the interface) at least one additional write request to the first SU set based on the at least one remaining EDS.

This disclosure presents, among other things, various novel solutions that allow for a rescue of a less than complete storage process such as made by a computing device to a set of storage units (SUs) (e.g., a first set of SUs). For example, when a computing device sends encoded data slices (EDSs) to a set of a width number of SUs, occasionally not all slices can be written to every SU due to availability or performance reasons. In such cases, the computing device may elect to store these slices in a DSN memory (assuming at least a write threshold number of slices were successfully stored). From time to time, a rebuild module, or the SU itself may check this DSN memory to see if slices have been stored to it. If so, that entity will read the slice from the DSN memory and store it on the SU it was destined for. Once successfully transferred to its intended destination, it can be deleted from the DSN memory. This eliminates the need to perform rebuilding of dropped slices which is far more expensive in terms of bandwidth required. For further improved security, there may be a unique vault reserved for each SU (for storing slices intended to be stored on that SU). Optionally, the slice may be encrypted with a key that is encrypted with a public key owned by the intended SU, such that only the intended SU may decrypt it. Finally, rebuild modules may store slices to this storage area in the DSN memory when rebuilding slices known to be lost but at times the SU is offline or is otherwise unable to receive them (e.g. due to performance reasons). This also provides flexibility to the SU to recover its rebuilt slices at a time that is convenient and non-disruptive to normal operations the SU may be performing at the time of the rebuild.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    an interface configured to interface and communicate with a distributed storage network (DSN);
    memory that stores operational instructions; and
    processing module operably coupled to the interface and to the memory, wherein the processing module, when operable within the computing device based on the operational instructions, is configured to:
        issue a set of write requests to at least one storage unit (SU) set based on a set of encoded data slices (EDSs) associated with a data object to be stored therein, wherein the data object is segmented into a plurality of data segments, wherein a data segment of the plurality of data segments is dispersed error encoded in accordance with dispersed error encoding parameters to produce the set of EDSs, wherein a write threshold number of EDSs provides for a successful transfer of the set of EDSs from a first at least one location in the DSN to a second at least one location in the DSN;
        based on a determination that at least the write threshold number of EDSs and fewer than all of the set of EDSs have been successfully stored within the at least one SU set, facilitate temporary storage within the DSN of at least one remaining EDS of the set of EDSs that has not been successfully stored within the at least one SU set;
        recover the at least one remaining EDS of the set of EDSs from the temporary storage within the DSN; and
        issue at least one additional write request to the at least one SU set based on the at least one remaining EDS.

2. The computing device of claim 1, wherein the processing module, when operable within the computing device based on the operational instructions, is further configured to:
    receive, from a requesting entity, a store data request that includes at least one of the data object, a data identifier, or a requesting entity identifier; and
    dispersed error encode the data object in accordance with the dispersed error encoding parameters to produce the set of EDSs.

3. The computing device of claim 1, wherein the processing module, when operable within the computing device based on the operational instructions, is further configured to:
    detect at least one storage failure associated with the at least one remaining EDS of the set of EDSs based on at least one of interpretation of at least one received write response that indicates a storage error or determination that a storage timeframe has elapsed since issuing at least one of the set of write requests without receiving a corresponding write response.

4. The computing device of claim 1, wherein the processing module, when operable within the computing device based on the operational instructions, is further configured to:
    issue a set of write requests to a first storage unit (SU) set based on the set of EDSs associated with the data object to be stored therein;
    determine that the write threshold number of EDSs and fewer than all of the set of EDSs have been successfully stored within the first SUs set based on at least some write responses that are received from at least some storage units (SUs) of the first SU set;
    determine to store temporarily within a second SU set the at least one remaining EDS of the set of EDSs that has not been successfully stored within the first SUs set;
    facilitate temporary storage of the at least one remaining EDS of the set of EDSs within the second SU set;
    recover the at least one remaining EDS from the temporary storage within the second SU set; and issue the at least one additional write request to the first SU set based on the at least one remaining EDS.

5. The computing device of claim 4, wherein the processing module, when operable within the computing device based on the operational instructions, is further configured to:
determine to store temporarily within the second SU set at least one remaining EDS of the set of EDSs that has not been successfully stored within the first SU set based on at least one of expected future availability of at least one SU of the first SU set, a predetermination, a priority level, interpretation of a request, interpretation of a system registry entry, a requesting entity identifier, an expected future availability of the at least one SU of the first SU set being less than an availability threshold level, or interpretation of the system registry that indicates to store temporarily at least one detected EDS error that is associated with a virtual storage vault affiliated with the requesting entity identifier.

6. The computing device of claim 1, wherein the processing module, when operable within the computing device based on the operational instructions, is further configured to:
based on another determination that fewer than the at least the write threshold number of EDSs have been successfully stored within the at least one SU set, continue to facilitate storage of the at least the write threshold number of EDSs within the at least one SU set to achieve successful storage of the at least the write threshold number of EDSs within the at least one SU set.

7. The computing device of claim 1, wherein:
a decode threshold number of EDSs are needed to recover the data segment;
a read threshold number of EDSs provides for reconstruction of the data segment;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

8. The computing device of claim 1, wherein the computing device is located at a first premises that is remotely located from a second premises of at least one SU of the at least one SU set within the DSN.

9. The computing device of claim 1 further comprising:
a SU of the at least one SU set within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A method for execution by a computing device, the method comprising:
issuing, via an interface of the computing device that is configured to interface and communicate with a distributed storage network (DSN), a set of write requests to at least one storage unit (SU) set based on a set of encoded data slices (EDSs) associated with a data object to be stored therein, wherein the data object is segmented into a plurality of data segments, wherein a data segment of the plurality of data segments is dispersed error encoded in accordance with dispersed error encoding parameters to produce the set of EDSs, wherein a write threshold number of EDSs provides for a successful transfer of the set of EDSs from a first at least one location in the DSN to a second at least one location in the DSN;
based on a determination that at least the write threshold number of EDSs and fewer than all of the set of EDSs have been successfully stored within the at least one SU set, facilitating temporary storage within the DSN of at least one remaining EDS of the set of EDSs that has not been successfully stored within the at least one SU set;
recovering the at least one remaining EDS of the set of EDSs from the temporary storage within the DSN; and
issuing at least one additional write request to the at least one SU set based on the at least one remaining EDS.

12. The method of claim 11 further comprising:
receiving, from a requesting entity, a store data request that includes at least one of the data object, a data identifier, or a requesting entity identifier; and
dispersed error encoding the data object in accordance with the dispersed error encoding parameters to produce the set of EDSs.

13. The method of claim 11 further comprising:
detecting at least one storage failure associated with the at least one remaining EDS of the set of EDSs based on at least one of interpretation of at least one received write response that indicates a storage error or determination that a storage timeframe has elapsed since issuing at least one of the set of write requests without receiving a corresponding write response.

14. The method of claim 11 further comprising:
issuing a set of write requests to a first storage unit (SU) set based on the set of EDSs associated with the data object to be stored therein;
determining that the write threshold number of EDSs and fewer than all of the set of EDSs have been successfully stored within the first SUs set based on at least some write responses that are received from at least some storage units (SUs) of the first SU set;
determining to store temporarily within a second SU set the at least one remaining EDS of the set of EDSs that has not been successfully stored within the first SUs set;
facilitating temporary storage of the at least one remaining EDS of the set of EDSs within the second SU set;
recovering the at least one remaining EDS from the temporary storage within the second SU set; and
issuing the at least one additional write request to the first SU set based on the at least one remaining EDS.

15. The method of claim 14 further comprising:
determining to store temporarily within the second SU set at least one remaining EDS of the set of EDSs that has not been successfully stored within the first SU set based on at least one of expected future availability of at least one SU of the first SU set, a predetermination, a priority level, interpretation of a request, interpretation of a system registry entry, a requesting entity identifier, an expected future availability of the at least one SU of the first SU set being less than an availability threshold level, or interpretation of the system registry that indicates to store temporarily at least one detected EDS error that is associated with a virtual storage vault affiliated with the requesting entity identifier.

16. The method of claim 11 further comprising:
based on another determination that fewer than the at least the write threshold number of EDSs have been successfully stored within the at least one SU set, continuing to facilitate storage of the at least the write threshold number of EDSs within the at least one SU set to achieve successful storage of the at least the write threshold number of EDSs within the at least one SU set.

17. The method of claim 11, wherein:
a decode threshold number of EDSs are needed to recover the data segment;
a read threshold number of EDSs provides for reconstruction of the data segment;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

18. The method of claim 11, wherein the computing device is located at a first premises that is remotely located from a second premises of at least one SU of the at least one SU set within the DSN.

19. The method of claim 11, wherein the computing device includes a SU of the at least one SU set within the DSN, a wireless smart phone, a laptop, a tablet, a personal computers (PC), a work station, or a video game device.

20. The method of claim 11, wherein the DSN includes at least one of a wireless communication system, a wire lined communication system, a non-public intranet system, a public internet system, a local area network (LAN), or a wide area network (WAN).

* * * * *